United States Patent [19]

Todeschini et al.

[11] 4,116,292

[45] Sep. 26, 1978

[54] HYDROSTATIC TRANSMISSIONS

[75] Inventors: Eugenio Todeschini, Latina; Gian Piero Riganti, Anzio, both of Italy

[73] Assignee: Massey-Ferguson Services N.V., Curacao, Netherlands Antilles

[21] Appl. No.: 797,663

[22] Filed: May 17, 1977

[30] Foreign Application Priority Data

May 20, 1976 [GB] United Kingdom ............... 20823/76

[51] Int. Cl.² .............................................. B62D 11/06
[52] U.S. Cl. .............................. 180/6.48; 60/DIG. 10
[58] Field of Search ............................. 180/6.7, 6.48; 60/DIG. 10, 486, 484

[56] References Cited

U.S. PATENT DOCUMENTS

| 2,036,437 | 4/1936 | Ruediger | 180/6.7 X |
|---|---|---|---|
| 3,279,172 | 10/1966 | Kudo | 60/484 |

Primary Examiner—Joseph F. Peters, Jr.
Assistant Examiner—R. Schrecengost
Attorney, Agent, or Firm—Thomas P. Lewandowski

[57] ABSTRACT

In a crawler vehicle having a rear housing or frame a splitter gearbox and double hydraulic pump for a hydrostatic transmission are mounted on the front flange of the rear housing for ease of servicing and plumbing. A single driveshaft from the engine drives the gearbox and an extra pump may be mounted on the splitter gearbox. The single driveshaft may constitute a power-take-off drive.

3 Claims, 6 Drawing Figures

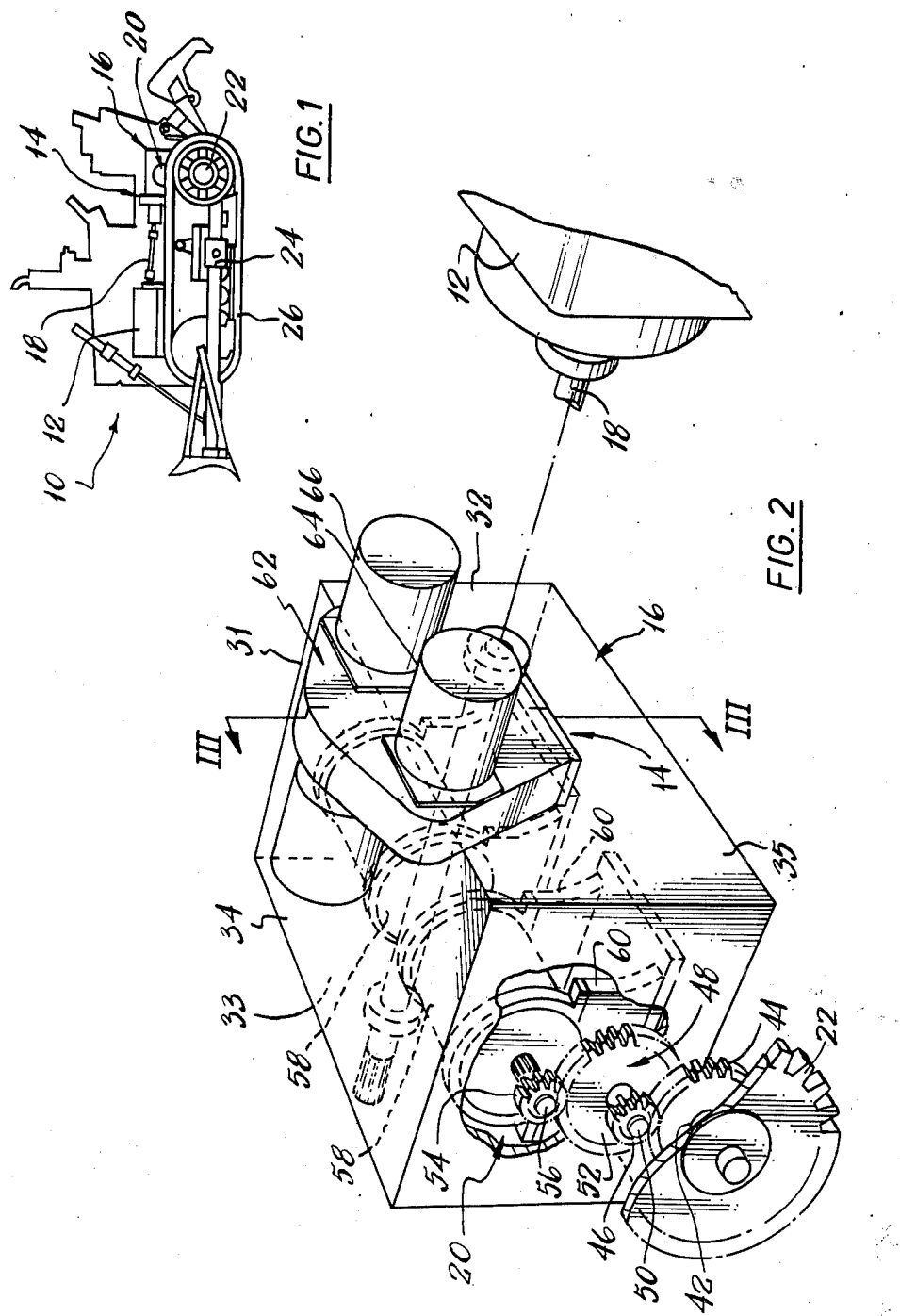

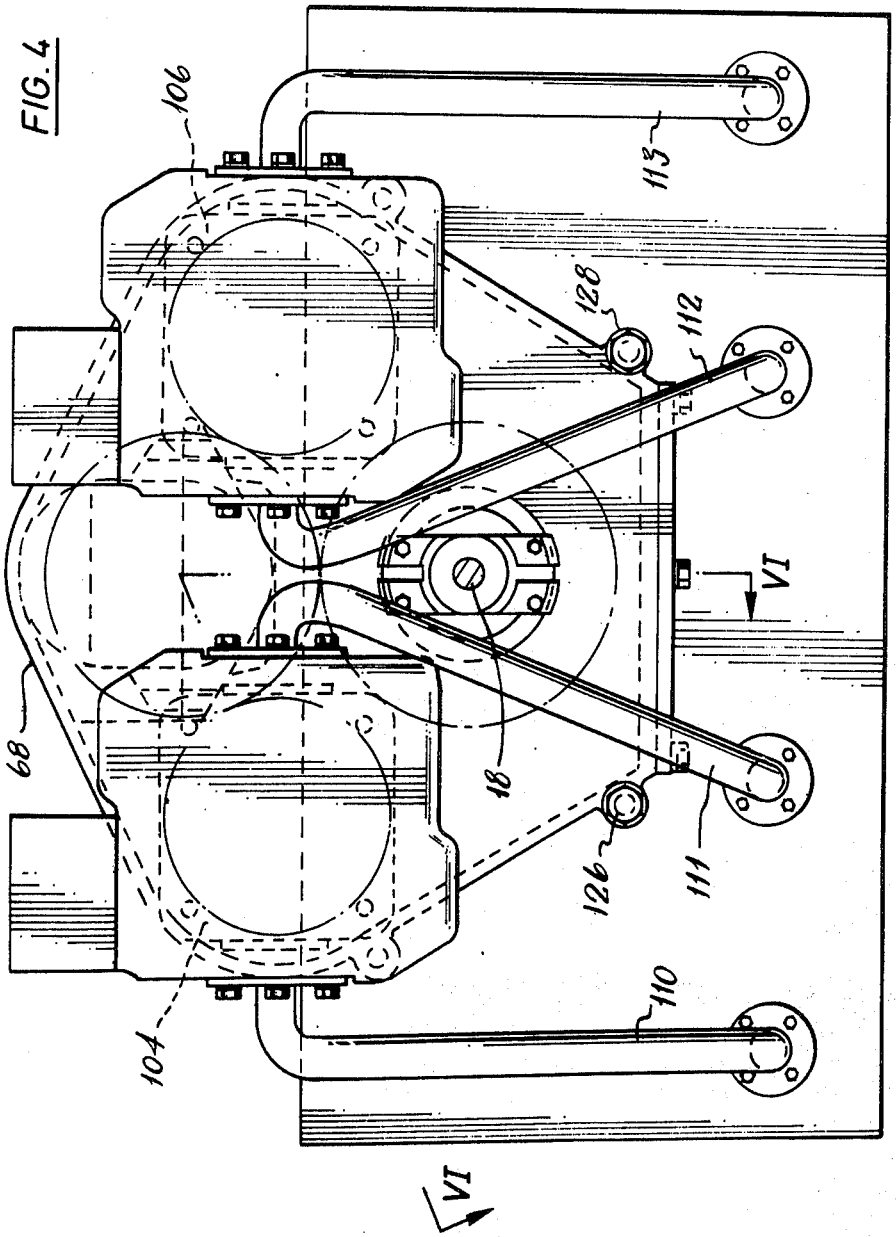

HYDROSTATIC TRANSMISSIONS

This invention relates to installations for hydrostatic transmission and in particular to such transmission used in crawler vehicles.

It is known to use a pair of hydrostatic transmissions, each comprising a pump and a motor, to propel a crawler vehicle. Each transmission drives a track so that full and infinitely variable control over each track is obtained thus permitting the vehicle to turn at any radius or to spin.

It has been previously proposed to mount the pumps adjacent the engine and the motors adjacent the track drives. Such an arrangement poses several problems, namely the transmission of high pressure fluid from the pump to the motor, the supply of low pressure charge fluid to the pumps and the location of a suitable sump to, on the one hand, collect leakage from the pumps and motors, and on the other hand, to be correctly positioned for supply of fluid to the pumps.

It is an object of the present invention to provide an arrangement wherein the above disadvantages are obviated or mitigated.

According to the present invention there is provided a crawler vehicle having a pair of tracks for propelling said vehicle, a drive assembly associated with each track and connected to opposite side members of a rear housing, a hydraulic motor connected to each drive assembly and located within said rear housing, a gear box mounted on an end face of said drive housing and having a power input and at least two power outputs, a pair of pumps each respectively connected to one of said power outputs, fluid conduit means connecting each pump to a motor and drive means connecting a prime mover to said power input.

An embodiment of the invention will now be described by way of example only with reference to the accompanying drawings in which:

FIG. 1 is a side view of a crawler tractor;

FIG. 2 is a diagrammatic representation of the drive arrangements of the crawler of FIG. 1;

FIG. 4 is a view in the direction of arrow IV of FIG. 3;

Figure 3:
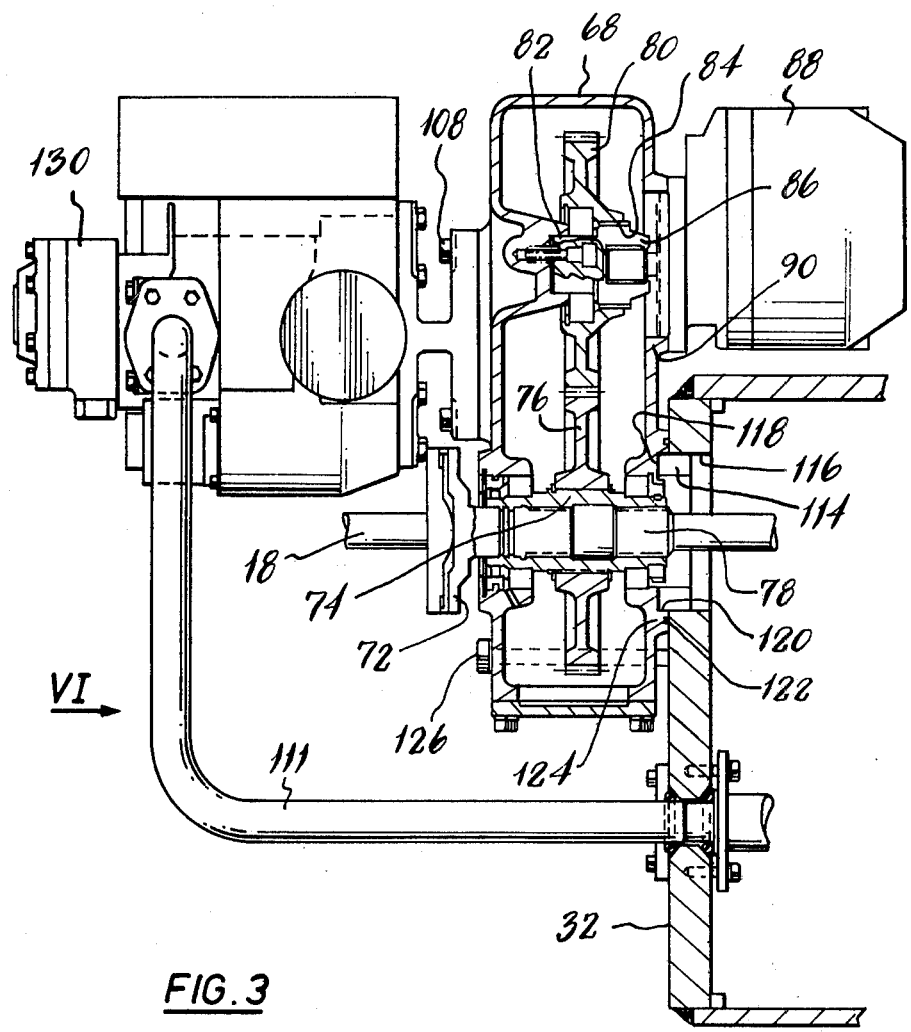
FIG. 3 is a view on the line III—III of FIG. 2.

Referring to FIG. 1, a crawler vehicle 10 has an engine 12 connected by a drive shaft 18 to a transmission assembly 14 located within a rear housing 16. A drive assembly 20 is mounted on either side of the rear housing 16 and drives a pair of chain sprockets 22. An undercarriage 24 supports a pair of track assemblies 26 which are driven by the sprockets 22.

As can best be seen in FIG. 2, the rear housing 16 comprises a box structure having a pair of side members 30, 31, a front face 32, a rear face 33, and top and bottom members 34, 35 respectively.

The drive assembly 20 mounted on each of the side members 30, 31, includes a gear housing, not illustrated, secured to the side members 30, 31. A shaft 42 is supported by the gear housing and is drivingly connected to the drive sprocket 22. A gear wheel 44 is nonrotatably connected to the shaft 42 and engages the smaller gear wheel 46 of a cluster 48 which is rotatably mounted on a shaft 50 also supported in the gear housing.

The larger gear wheel 52 of the cluster 48 meshes with a gear wheel 54 nonrotatably connected to a shaft 56 which passes through the side member 30. The shaft 56 is connected to a hydraulic motor 58 which is mounted within the rear housing 16 on pads 60.

Figure 5:
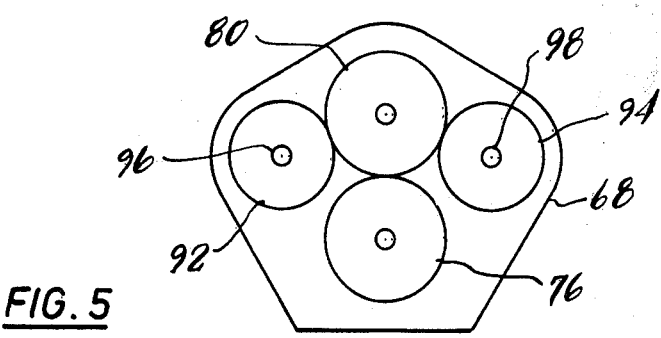
FIG. 5 is a view similar to FIG. 4 showing the interrelation of components of the gear box.
Figure 6:
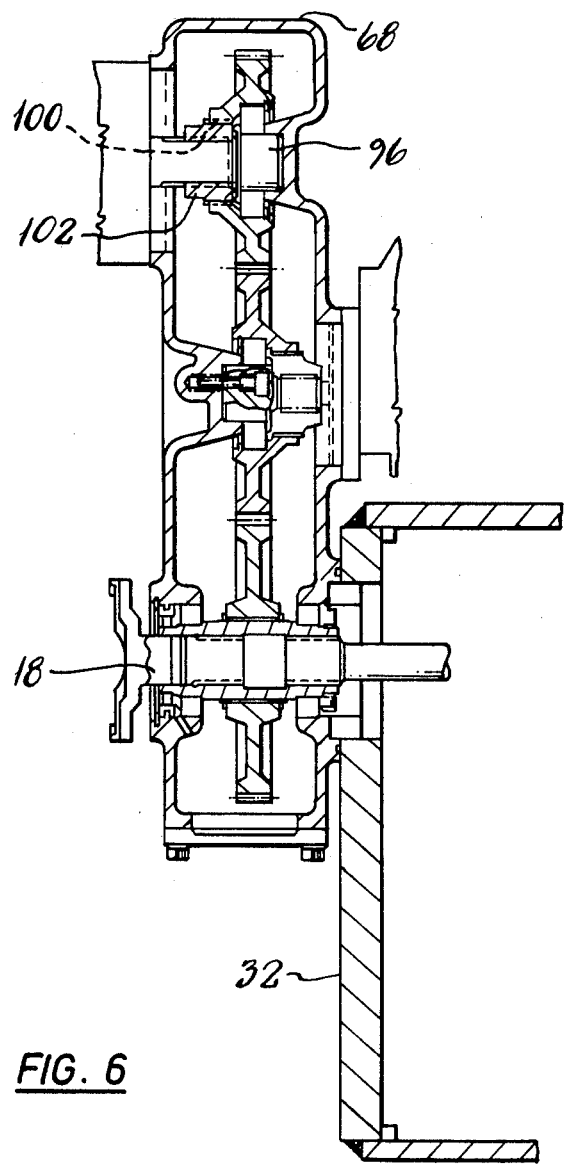
FIG. 6 is a view on the line VI—VI of FIG. 4.

The transmission assembly 14 is mounted on the front face 32 of the rear housing 16 and includes a splitter gear box 62 and a pair of hydraulic transmission pumps 64, 66. The splitter gear box comprises a casing 68 supporting a gear train 70 which is best seen in FIGS. 3, 5 and 6. The drive shaft 18 is connected to a main shaft 72 which drives through a splined hub 74 to a drive gear 76. An auxiliary power take off shaft 78 is driven by the hub 74 and passes through the rear housing 16.

The drive gear 76 meshes with a power splitting lay gear 80 rotatably mounted on a lay shaft 82. The lay gear 80 has an internally splined aperture 84 which receives a splined adapter shaft 86 driving an auxiliary pump 88. The pump 88 is mounted on a flange 90 of the casing 68.

The lay gear 80 meshes with a pair of driven gears 92, 94, which are mounted respectively on an idler shaft 96, 98 supported in casing 68. Each of the driven gears 92, 94 has an internally splined aperture 100, which receives an adapter 102. The adapter 102 connects the driven gears 92, 94 with the pumps 64, 66 respectively which are mounted on the casing 68 to cover apertures 104, 106 and are secured by bolts 108. A charge pump 130 is mounted on the rear of one of the pumps 62, 64 in a conventional manner.

Each of the pumps 62, 64 is hydraulically connected to its associated motor by means of a pair of conduits 110, 111, and 112, 113 respectively. Each conduit is formed in two parts that are joined at the front face 32 to facilitate servicing.

The casing 68 is located on the front casing 32 by means of a spigot ring 114 located in an aperture 116 in the front casing 32 abutting a shoulder 118 in an annular recess 120 in the casing 68. A seal 122 is held in an annular recess 124 in the casing 68 to form a fluid tight seal between the casing 68 and the front face 32.

The casing 68 is held by four bolts 126 passing through bosses 128 in the periphery of the casing 68 and threading into the front face 32. The bolts are disposed symetrically about the horizontal and vertical centre lines of the recess 120 to ensure the casing 68 is held squarely on the front face 32.

The rear casing 16 may conveniently be used to provide a sump for the pressure fluid used in the pumps. It is convenient for collection of leakage from the motors 58 and for the supply of fluid to the charge pump 130. The motors 58 are also enclosed by fluid which assists cooling. Further, by mounting the transmission assembly 14 on the rear housing 16 only one drive shaft 18 from the engine 12 is required.

The drive shaft 18 rotates the drive gear 76 and with it the lay gear 80 and the driven gears 92, 94.

The pumps 64, 66 are thus driven and deliver fluid to their respective motors 58 which transmit drive through the drive assembly 20 to the sprocket 22.

The arrangement described results in a compact, serviceable unit with a minimum of components. The pumps and motors are conventional fixed or variable delivery units of known construction and consequently have not been described in detail.

What we claim is:

1. A crawler vehicle having a pair of tracks for propelling said vehicle, a rear housing, a drive assembly associated with each track and connected to opposite side members of said rear housing, a hydraulic motor connected to each drive assembly and located within said rear housing, a gear box mounted on the outside of an end face of said rear housing and having a power input and at least two power outputs, a pair of pumps mounted on said gear box external thereof each respectively connected to one of said power outputs, fluid conduit means connecting each pump to a motor and drive means connecting a prime mover to said power input.

2. A vehicle as claimed in claim 1 wherein said power input is a drive shaft passing through said gear box and said rear housing to provide a power take off for the vehicle.

3. A vehicle as claimed in claim 1 including an auxiliary pump mounted on said gear box outside of said drive housing.